United States Patent
Sykes et al.

(10) Patent No.: US 9,794,340 B2
(45) Date of Patent: Oct. 17, 2017

(54) MECHANISM AND METHOD FOR ACCESSING DATA IN A SHARED MEMORY

(71) Applicant: GE Aviation Systems LLC, Grand Rapids, MI (US)

(72) Inventors: Gregory Reed Sykes, Caledonia, MI (US); Christian Reynolds Decker, Melbourne, FL (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 520 days.

(21) Appl. No.: 14/486,336

(22) Filed: Sep. 15, 2014

(65) Prior Publication Data

US 2016/0080491 A1 Mar. 17, 2016

(51) Int. Cl.
*H04L 29/08* (2006.01)
*G06F 21/79* (2013.01)
*H04L 29/06* (2006.01)

(52) U.S. Cl.
CPC .......... *H04L 67/1097* (2013.01); *G06F 21/79* (2013.01); *H04L 67/12* (2013.01); *H04L 67/42* (2013.01)

(58) Field of Classification Search
CPC ..... H04L 67/1097; H04L 67/12; H04L 67/42; G06F 21/79
USPC ........................................................ 709/213
See application file for complete search history.

(56) References Cited

U.S. PATENT DOCUMENTS

| | | |
|---|---|---|
| 5,715,447 A | 2/1998 | Hayashi et al. |
| 5,797,138 A | 8/1998 | Park et al. |
| 9,098,462 B1* | 8/2015 | McNicholl .......... G06F 13/1631 |
| 2002/0144010 A1* | 10/2002 | Younis .................... G06F 9/546 719/314 |
| 2006/0259571 A1* | 11/2006 | Talluri .................... G06F 9/526 709/213 |
| 2008/0148095 A1* | 6/2008 | Perdomo ............... G06F 11/141 714/6.12 |
| 2009/0328059 A1* | 12/2009 | Haba ...................... G06F 9/544 719/312 |
| 2010/0199280 A1* | 8/2010 | Vestal ................... G06F 9/4881 718/102 |
| 2013/0262423 A1 | 10/2013 | Graefe et al. |

(Continued)

FOREIGN PATENT DOCUMENTS

| | | |
|---|---|---|
| EP | 0551528 A1 | 8/1992 |
| WO | 0113229 A2 | 2/2001 |
| WO | 0186442 A2 | 11/2001 |

OTHER PUBLICATIONS

Swenson, et al., "A New Approach to Zero-Copy Message Passing with Reversible Memory Allocation in Multi-core Architectures", Proceedings of the 26th Workshop on Principles of Advanced and Distributed Simulation, PADS, IEEE, ISBN 978-1-4673-1797-9, ISBN 1-4673-1 797-7, 2012.

(Continued)

*Primary Examiner* — Nicholas Taylor
*Assistant Examiner* — Chong G Kim
(74) *Attorney, Agent, or Firm* — GE Global Patent Operation; William S. Munnerlyn

(57) ABSTRACT

A mechanism and method for accessing data in a shared memory by at least one client, includes an allocation of data in the shared memory, the memory configured in a plurality of buffers, and accessing the data by a client or a server without locking or restricting access to the data.

15 Claims, 4 Drawing Sheets

(56) References Cited

U.S. PATENT DOCUMENTS

2015/0378936 A1* 12/2015 Danielsson ......... G06F 12/1458
　　　　　　　　　　　　　　　　　　　　　　　711/163
2016/0004478 A1* 1/2016 Mortier ................ G06F 9/544
　　　　　　　　　　　　　　　　　　　　　　　719/314

OTHER PUBLICATIONS

Mahajan, et al., "Globilizing Selectively: Shared-Memory Efficiency with Addressspace Separation", Proceedings of the International Conference for High Performance Computing, Networking, Storage and Analysis, SC13, ISBN 978-1-4503-23 78-9, 2013.
Office Action issued in connection with corresponding GB Application No. GB1516085.6 on Mar. 24, 2016.

* cited by examiner

MECHANISM AND METHOD FOR ACCESSING DATA IN A SHARED MEMORY

BACKGROUND OF THE INVENTION

A line-replaceable unit (LRU) is a modular component of a larger unit, such as a vehicle or aircraft, and is designed to specifications to assure they can be interchanged and/or replaced in the event of failure. LRUs of an aircraft, for example, may include entirely contained systems, sensors, radios, or other auxiliary equipment to manage and/or operate aircraft functions. In the aircraft environment, LRUs may be designed to operate according to a particular operation, interoperability, and/or form factor standards, such as those defined by ARINC series standards.

A plurality of LRUs may be interconnected by a data network to access or exchange data in a common, or shared memory, of a flight control computer or other computer system. The flight control computer or other computer system may further manage and/or operate aircraft functions.

BRIEF DESCRIPTION OF THE INVENTION

In one embodiment, a mechanism for accessing data in a shared memory by at least one client, the mechanism including an allocation of data in the shared memory into at least one topic, the allocation being accessible by a predetermined constant address, the at least one topic having a number of buffers, the number of buffers being equal to a number of clients accessing the at least one topic, plus two for each server accessing the at least one topic, each client and each server having an active access pointer, and an active access pointer director to direct active access pointers to buffers based on a transaction request from a client or a server. One buffer always includes the most recent data in the shared memory, and at least one buffer is always available to access data in the shared memory. Additionally, the active access pointers are allocated among buffers by the active access pointer director using only machine assembly language transactions without copying the data at an operating system level.

In another embodiment, a method for accessing data in a shared memory by at least one client, the method includes allocating data in the shared memory into at least one topic, assigning a single predetermined address to access each at least one topic, allocating a number of buffers for each at least one topic, equal to the number of clients accessing the at least one topic, plus two for each server accessing the at least one topic, and responding to transaction requests from at least one of clients or servers by allocating an active access pointer for each respective client or server to a buffer. The data is accessed via the buffer without copying the data at an operating system level.

DESCRIPTION OF EMBODIMENTS OF THE INVENTION

The described embodiments of the present invention are illustrated in the environment of aircraft having a plurality of sensors, systems, software components, and/or physical components of the aircraft all operating on a single system directly accessing a common or shared memory. However, embodiments of the invention may be implemented in any environment using clients and servers accessing a common or single shared memory. Furthermore, while "clients" and "servers" are described below, it will be understood that the particular embodiments described are non-limiting examples of both clients and servers. Additionally, while a "client" is described, any component or "consumer" of data from the shared memory may be included. Likewise, while a "server" is described, any component of "producer" of data for the shared memory may be included. Additional examples of clients and servers may include remote or localized discrete units, applications, computer processes, processing threads, etc., or any combination thereof, which access a shared memory. For example, a plurality of "clients" may all reside on a single computer or computing unit, accessing common random access memory (RAM).

Figure 1:
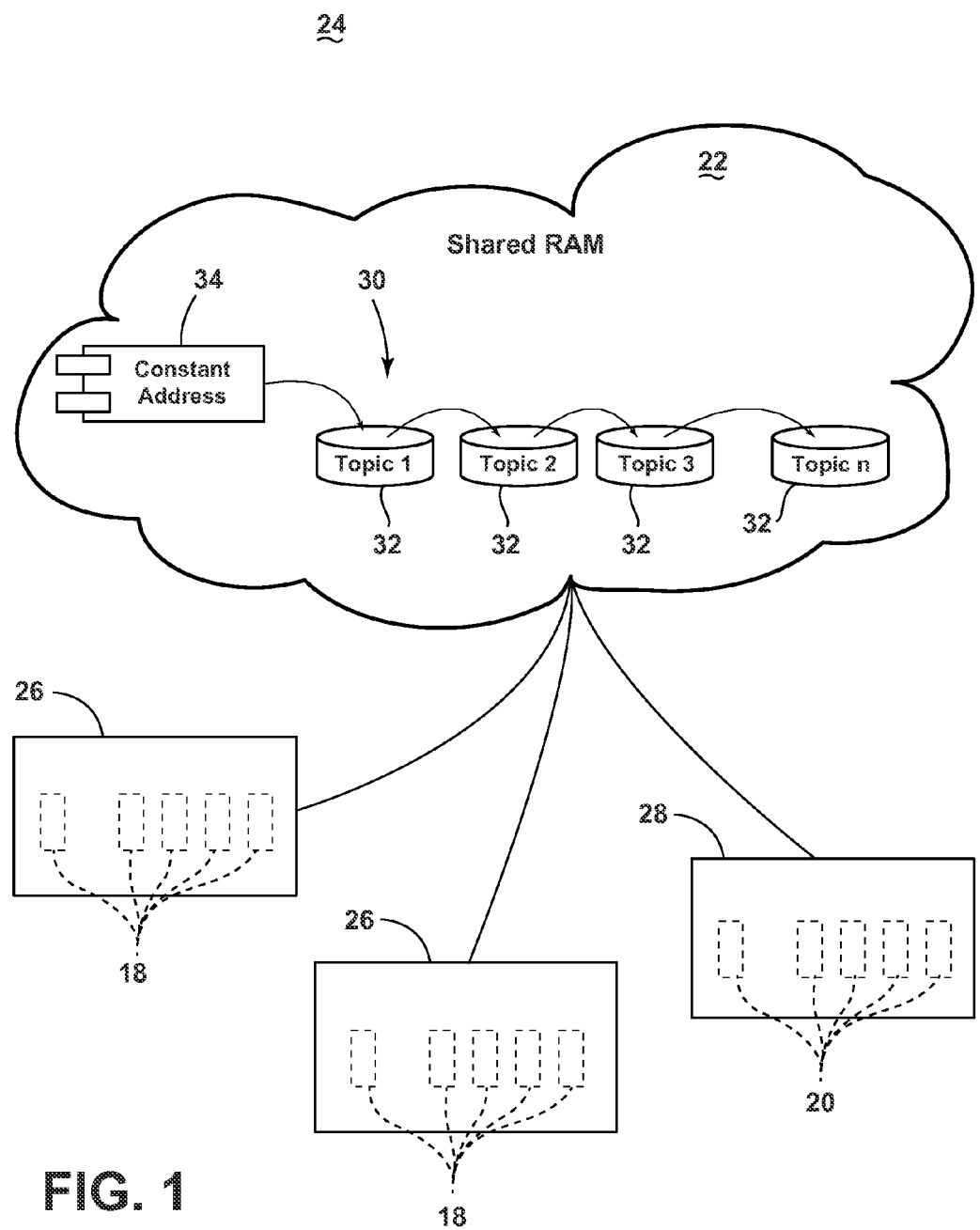
FIG. 1 is a schematic view of a data communications network of an aircraft, in accordance with one embodiment of the invention.

FIG. 1 shows a schematic illustration of a data communications system 24 in accordance with one embodiment of the invention. One or more threads or computer processes 26, each including one or more clients 18, have communicative access to a shared memory 22, shown as shared RAM. Additionally one or more threads or computer processes 28 may each including one or more servers 20, has also has access to the shared memory 22. In this sense, each process 26, 28, client 18, and server 20 may have access to the shared memory 22. Additionally, while some processes 26, 28 are illustrated showing only respective client 18 or servers 20, embodiment of the invention may include processes 26, 28 that include a combination of clients 18 and/or servers 20 within a single process 26, 28. While a server 20 is described, embodiments of the invention may include any computing system, a computing system running an ARINC 653 operating system, a flight management system, a flight computer, etc.

The memory 33 may include random access memory (RAM), flash memory, or one or more different types of portable electronic memory, etc., or any suitable combination of these types of memory. The clients 18 and/or servers 20 may be operably coupled with the memory 22 such that the clients 18 and/or servers 20, or any computer programs or processes thereon, may access at least a portion of the memory 22 (e.g. "shared memory" 22).

As used herein, "programs" and/or "processes" may include all or a portion of a computer program having an executable instruction set for controlling the management and/or operation of at least one of the respective client 18, server 20, or aircraft functions. The program and/or processes may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc., that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, controller, or special purpose processing machine to perform a certain function or group of functions.

The data communications network 24 shown in FIG. 1 is merely a schematic representation of one embodiment of the invention, and used to illustrate that a plurality of clients 18 and servers 20 may be located on the same computing system of the aircraft. The exact location of the clients 18 and servers 20 are not germane to the embodiments of the invention. Additionally, more or fewer clients 18 and/or servers 20 may be included in embodiments of the invention.

The communications network 24 may include a system bus or other computing system communicative components to facilitate the communicative interconnection between the clients 18 and servers 20. Furthermore, the configuration and operation of the communications network 24 may be defined by a common set of standards or regulations applicable to particular aircraft environments.

The memory 22 is shown further comprising an allocation of data 30 into at least one grouping, or "topic" 32, positioned at a predetermined constant addressable memory location, or "constant address" 34 of the memory 22. As used herein, a "topic" may include a predetermined subset of memory 22 allocated for a particular utilization of data storage for the aircraft. For example, a single topic 32 may comprise a single allocation of data, such as airspeed of the aircraft, or it may comprise a plurality of related or unrelated data elements, such as waypoints or the current flight plan. As shown, the topics 32 may be arrayed in a sequential fashion originating from the constant address 34, such as a singly-linked list; however, additional organization structures of the topics 32 may be configured to include matrices, variable allocations for each topic 32, etc., all originating from the constant address 34 location.

Each of the processes 26, 28, and/or respectively, the clients 18 and servers 20 are preconfigured to include the predetermined constant address 34 of the shared memory 22. In this sense, each process 26, 28, clients 18, and/or server 20 is preconfigured to identify the location of the constant address 34, and consequently, the one or more topics 32 having the data to be accessed. As used herein, each client 18 and/or each client process 26 may be considered a "client" for accessing data in the shared memory 22, and each server 20 and/or each server process 28 may be considered a "server" for accessing data in the shared memory 22.

In one embodiment of the invention, the number of topics 32 in the shared memory 22 is predefined during the initialization of the memory 22, based on a known number of topics 32 accessible to the clients and/or servers. In another embodiment of the invention, the number of topics 32 is defined at or during runtime by the collective number of topics 32 accessible by the clients and/or servers. In this sense, the number of topics 32 may be dynamic, increasing and decreasing as needed, or only additive when additional topics 32 need to be accessed.

Figure 2:
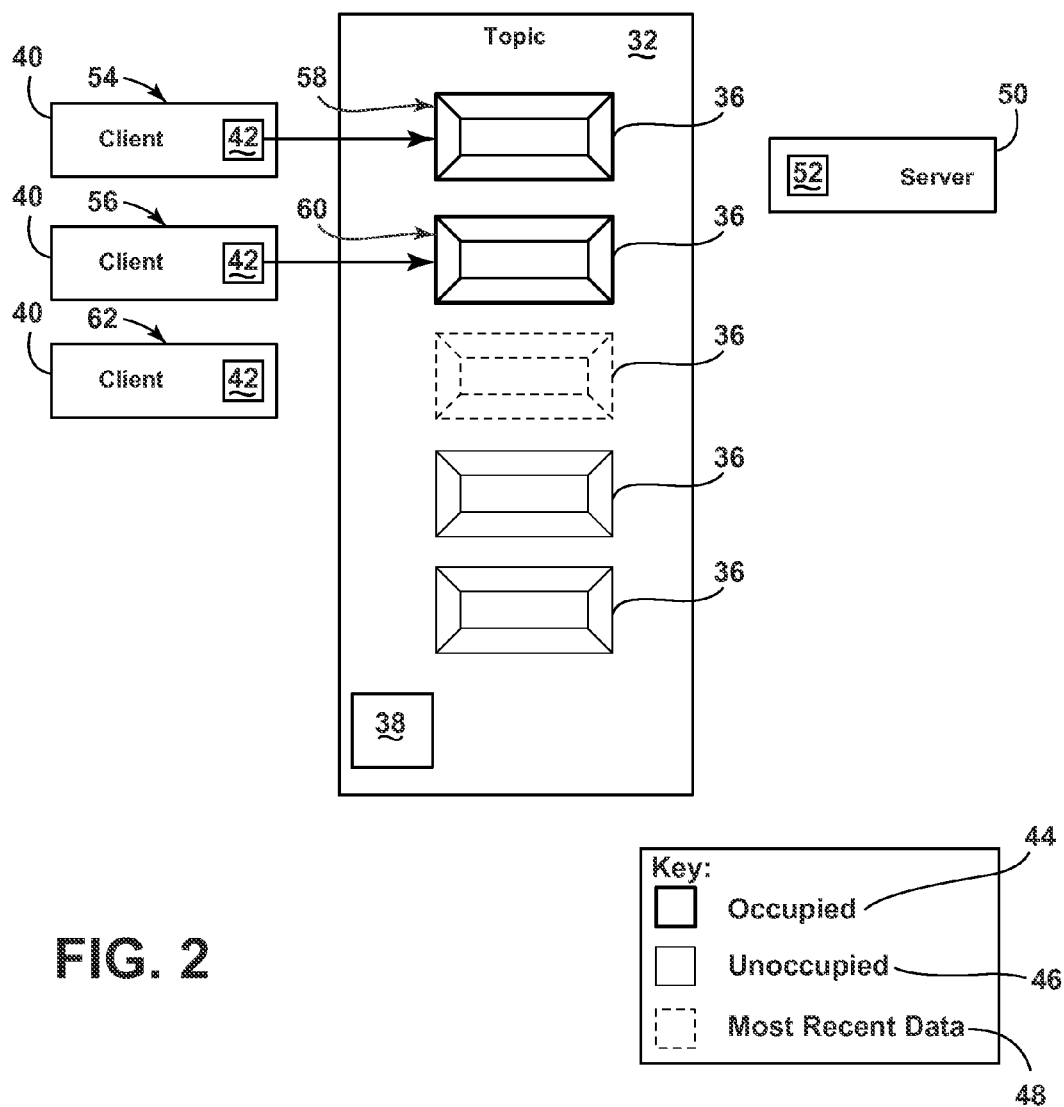
FIG. 2 is a schematic view of clients accessing the buffers of a topic, in accordance with one embodiment of the invention.

Turning now to FIG. 2, each topic 32 further comprises a plurality of buffers 36 configured to store a predetermined amount of data as needed for a particular data element. For example, a topic 32 for accessing the airspeed of the aircraft may have a plurality of buffer 36, each configured to store eight bytes. In another example, a topic 32 for accessing the current flight plan may have a plurality of buffers 36, each configured to store one thousand bytes. For illustrative purposes, the plurality of buffers 36 are shown having different classification states, including occupied 44, unoccupied 46, and containing the most recent data 48. Each state will be explained in additional detail below.

Each topic 32 is further shown including a controlling and/or directing functional element, such as an active access pointer director 38. The active access pointer director 38 directs access to the plurality of buffers 36 based on a data transaction request, which will be further explained below. Alternative embodiments of the invention may include a separate or remote active access pointer director 38, for example, a controller or processor, located remotely from the topic 32.

As schematically shown, one or more clients 40, each comprising an active access pointer 42, is capable of accessing a specific buffer 36 that is identified by the respective active access pointer 42. Additionally, one or more servers 50, each comprising an active access pointer 52, is capable of accessing a specific buffer 36 that is identified by the respective active access pointer 52. As illustrated, a first client 54 and second client 56 are associated with, respectively a first buffer 58 and a second buffer 60. Accordingly, the first and second buffers 58, 60 have been identified as occupied buffers 44. A third client 62 is shown unassociated with the topic 32, as is the server 50. While each of the active access pointers 42, 52 are shown as part of the clients 40 or servers 50, respectively, embodiments of the invention may include active access pointers 42, 52 as part of the topic 32 and/or buffers 36.

In one embodiment of the invention, the number of buffers 36 in each topic 32, and the size of the each buffer 36 are predefined during the initialization of the shared memory 22, based on a known number of clients 40 and/or servers 50 capable of accessing the topic 32. In another embodiment of the invention, the number of buffers 36, in each topic 32, is defined at or during runtime by the collective number of clients 40 and servers 50, then accessing the topic 32. In this sense, the number of buffers 36 may be dynamic, increasing and decreasing as needed, or only additive when additional clients 40 and/or servers 50 are accessing the topic 32. Additionally, embodiments of the invention may include defining the buffers 36 in a similar style as defining the topics 32, e.g. predefining both topics 32 and buffers 36 at initialization of the shared memory 22, or in different styles, e.g. predefining the topics 32, but the buffers 36 are dynamically defined. In any of the described embodiments, the total number of buffers 36 may be equal to the number of clients 40 accessing the topic 32, plus two buffers 36 for each server 50 accessing the topic 32.

Figure 3:
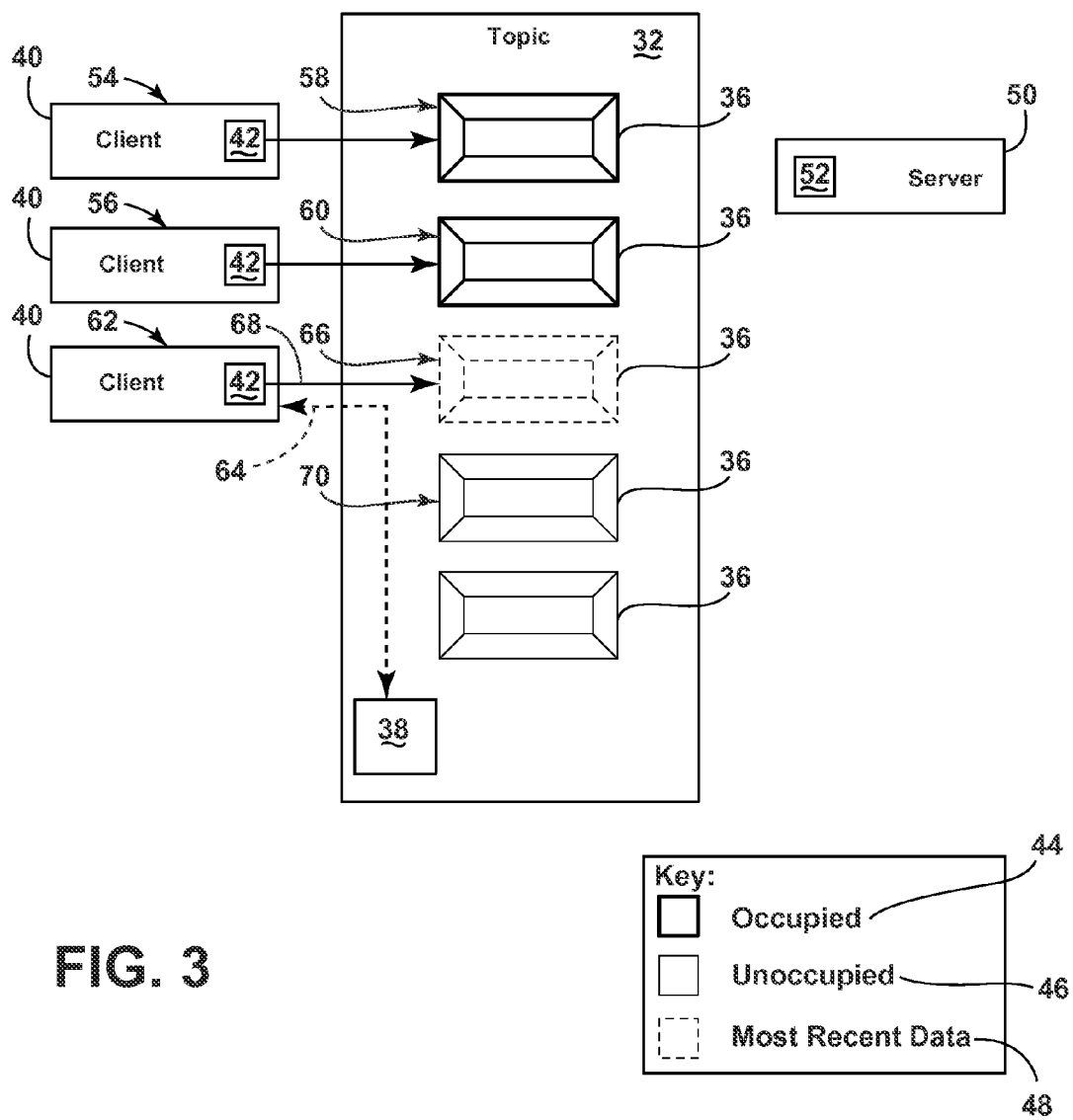
FIG. 3 is a schematic view of a mechanism for clients to access the most recent data in a buffer, in accordance with one embodiment of the invention.

Turning now to FIG. 3, a mechanism for accessing data in the topic 32 and/or buffer 36 of the shared memory 22 is described. A third client 62 is communicatively coupled with the topic 32, and communicates with the active access pointer director 38 of the topic (illustrated as dotted-line communication 64) to request a transaction with the data. The active access pointer director 38 responds to the third client 62, identifying a third buffer 66 which includes the most recent data 48 of the topic 32. The third client 62, now directed to the third buffer 66, instructs its active access pointer 42 to the third buffer 66 (illustrated as a second communication 68). At this stage, the third client 62 accesses the data stored in the third buffer 66 (the most recent data 48), and performs the intended transaction on the data.

The active access pointer director 38 may direct the active access pointers 42, 52 of the one or more clients 40 or server 50 to a particular buffer 36 based on the specific transaction requested. For example, the transaction may include at least one of reading the data stored in the buffer 36 (i.e. "read only"), reading the data stored in the buffer 36 and writing new data to the buffer 36 based on a processing or computation of the data read, writing new data to the buffer 36 based on data provided by the client (i.e. "read/write"), and/or writing new data from the server 52 into the buffer 36 with instruction to commit the new data, for example, to another portion of the shared memory 22, such that it is visible and/or accessible to the one or more clients 40 (i.e. "store"). In one example, a "store" transaction may identify the committed data as the most recent data 48.

In one example of the mechanism for accessing data in the topic 32 and/or buffer 36 of the shared memory 22, one or more clients 40 in communication with the topic 32 requesting a read only transaction may each be assigned to the same buffer, such as the third buffer 66, which includes the most recent data 48 of the topic 32. Since neither client will be modifying the data in this instance, there will be no collisions, or issues with data integrity of the data accessed. As such, read only clients 40 may perform their transactions asynchronously with respect to each other without interference. As explained, the ratio of assigned read only clients 40 to buffers 36 does not need to be one to one; it may be many to one. Once the read only clients 40 have completed their respective transactions, they may communicatively uncouple from their respective buffer 36 until another transaction is requested. Upon the second transaction request, the mechanism repeats such that the client 40 may access the most recent data 48, as identified by the active access pointer director 38, which may be the same data in the same buffer 36, or new data in the same or different buffer 36.

Figure 4:
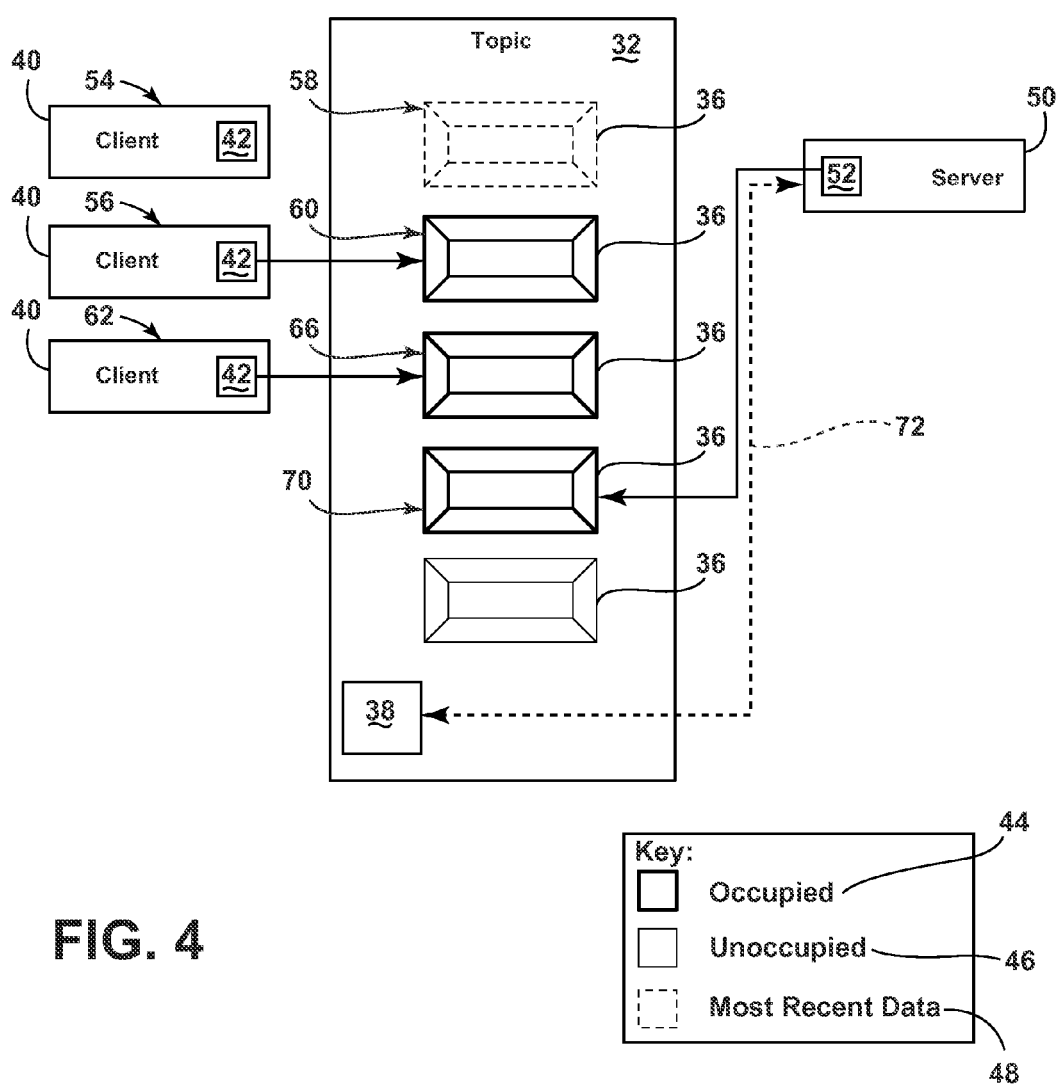
FIG. 4 is a schematic view of a mechanism for clients and a server performing a read/write transaction to data in a buffer, in accordance with one embodiment of the invention.

The above-described example of the mechanism may be illustrated in FIG. 4, building on the mechanism shown in FIG. 3. In this example, the server 50 had been executing a read/write transaction on the first buffer 58, wherein the data written will be identified as "new" most recent data 48. As shown, when the server 50 completes the read/write transaction, the server 50 will decouple communication with the first buffer 58, and communicate to the active access pointer director 38 that the first buffer 58 includes "new" most recent data 48 (the communication illustrated as dotted-line communication 72). The active access pointer director 38, in turn, identifies the first buffer 58 as including the most recent data 48, and will now direct newly communicating clients 40 to the most recent data 48 of the first buffer 58. Also shown, if the server 50 requests a new read/write transaction, the active access pointer director 38 optionally copies the most recent data 48 of the first buffer to the fourth buffer 70, and directs the active access pointer 52 of the server 50 to the fourth buffer 70 to perform the new read/write transaction.

When any server 50 performing a transaction on a buffer 36 has completed its transaction, regardless of the type of transaction, the server 50 may optionally instruct the active access pointer director 38 the transaction is completed. The active access pointer director 38, in this sense, may keep record of which buffers 36 are currently used and/or currently being accessed. If the server 50 requests an additional transaction, the server will communicate with the active access pointer director 38, which will assign an unoccupied buffer 46 with which to complete the new transaction.

While this example illustrates server 50 operations, it will be understood that clients 40 may be capable of performing similar read transactions. Furthermore, embodiments of the invention may include clients 40 and/or servers 50 that may provide similar read, or read/write transactions as described herein. In this sense, the server 50 may sometimes act as if it was a client 40, and a client 40 may sometimes act as if it was a server 50. However, some differences exist between the client 40 and server 50 operations. For example, while multiple read-only clients 40 may access a single buffer 36 simultaneously, only a single server 50 may access a single buffer 36 at one time. In another example, while the active access pointer director 38 may direct the active access pointer 42 of a client 40 to a buffer including the most recent data 48 for a transaction, the active access pointer director 38 will only direct the active access pointer 52 of a server 50 to an unoccupied buffer 46, and never the most recent data buffer 48, in order to prevent data corruption of the most recent data 48.

The above-described mechanism is arranged and configured so that one of the buffers 36 of the topic 32 will always be identified by the active access pointer director 38 as containing the most recent data 48, for access by the one or more clients 40 and/or by one or more servers 50. Additionally, the above-described mechanism may be configured such that each client 40 performing a transaction on the accessible data of the topic 32 is provided access of the most recent data 48 at the time the client 40 requests the transaction. If more recent data is identified during an existing client 40 transactions, that client 40 will complete the transaction on the most recent data 48 at the time of the requested transaction. Stated another way, the most recent data 48 may only be confirmed or guaranteed at the time of the request of the transaction, not during or at the completion of the transaction.

The above-described mechanisms may operate using only machine assembly language transactions without copying the data at design level beyond machine assembly language, such as without copying the data at an operating system level (e.g. "zero copy"). The technical effect of the above-described embodiments is the zero-copy operation is achieved by directing the clients 40 and/or servers 50, using active access pointers 42, 52, to respective buffers 36 including the most recent data 48, such that the most recent data 48 is never "locked" or "blocked" from access by other clients 40 and/or servers 50. Additionally, the use of machine assembly language allows for "atomic swap" operations of the pointers, wherein the update is completed in a single atomic cycle of operation, and thus cannot be interrupted by other updates to the active access pointers since other updates cannot be completed in a cycle of operation shorter than the atomic swap.

By utilizing machine assembly language instructions and basic data structures (e.g. singly-linked lists, basic pointers), the mechanisms provide for asynchronous inter-process data communications between at least one server 50 and at least one client 40, in a shared memory 22, using a zero-copy data exchange, allowing for "lock-free," or "block-free" access for the accessible data without complex configuration of process priority, or the phenomena of "priority inversion," wherein a pre-accessing lower priority process locks the data and does not "release" it for access even when a higher priority process requests access. In fact, since operations using machine instructions tend toward "first one to the data wins," higher-priority processes may always perform their operations first.

Embodiments of the invention may further utilize the above-described mechanisms by providing programming application programmable interfaces (APIs) to access the mechanisms at an operating system level (or application level, etc.) via the APIs. The technical effect is that the above described embodiments provide for the zero-copy method to prevent data locking, data blocking, and/or priority inversion.

An additional advantage that may be realized in the above embodiments is that the above-described embodiments prevent poor system performance that results from data-copying efforts at a non-machine language level. Data-copying efforts may take a long period of time for reading and/or writing requests of large files. By utilizing pointers and pointer swaps, additional copying can be avoided while providing access to all the components that need access to the data. Another advantage of the above-described embodiments includes a built-in mechanism for overwriting older data in the buffers, and thus, does not require any type of "garbage collection" data management schemes. Furthermore, typical data sharing from a server to one or more clients is accomplished by creating a global data storage and protecting it using semaphores (i.e. access-controlling values such as locked/unlocked indicators) at, for example, an operating system level, any other mutex or locking data protections (e.g. data interrupts, etc.), and subsequently copying the data, which may be quite costly in terms of processing time, especially when the data stores are large. This allows for more efficient, and faster, lock-free access operations, as described herein.

Other advantages that may be realized in the above-described embodiments include that the topic design has the flexibility to keep the processes loosely coupled, requires little coordination, and does not require a "staged startup" (i.e. processes, client, and/or servers can come online at any time). Additionally, implementation of the above-described APIs may result in reduced development costs for system development, and increased performance margins on similar hardware, compared with different copy methods.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mechanism for accessing data in a shared memory by one or more clients, comprising:
   an allocation of data in the shared memory into at least one topic, wherein the allocation of data is accessible by a predetermined constant address;
   the at least one topic having a plurality of buffers, wherein a number of the buffers is equal to a number of the clients accessing the at least one topic, wherein the plurality of buffers comprises two or more respective buffers for each of at least one server accessing the at least one topic, and wherein the one or more clients and the at least one server have an active access pointer; and
   an active access pointer director to direct a number of active access pointers to the plurality of buffers based on a transaction request from the one or more clients or the at least one server;
   wherein the plurality of buffers comprises one or more respective buffers that include the most recent data in the shared memory, and at least one buffer that is available to access data in the shared memory;
   wherein the number of active access pointers are allocated among the plurality of buffers by the active access pointer director using machine assembly language transactions configured to perform a zero-copy data exchange at an operating system level; and
   wherein the machine assembly language transactions provide the mechanism with asynchronous inter-process data communications between the at least one server and the one or more clients in the shared memory.

2. The mechanism of claim 1 wherein the mechanism is a flight management system.

3. The mechanism of claim 1 wherein a plurality of topics are arrayed in the shared memory.

4. The mechanism of claim 1 wherein the at least one topic and the plurality of buffers are predefined during initialization of the shared memory.

5. The mechanism of claim 1 wherein at least one of the at least one topic or the plurality of buffers are defined during runtime by a collective number of the clients and the servers accessing the at least one topic.

6. The mechanism of claim 1 wherein the one or more clients or the at least one server accesses the data associated with the active access pointer director.

7. mechanism of claim 6 wherein the active access pointer director directs the number of active access pointers for new transactions to a different buffer comprising the most recent data in response to a completed transaction request.

8. A method for accessing data in a shared memory by one or more clients, the method comprising:
   allocating data in the shared memory into at least one topic;
   assigning a single predetermined address to access each of the at least one topic;
   allocating a plurality of buffers for each of the at least one topic, wherein a number of the buffers is equal to a number of the clients accessing the at least one topic, wherein the plurality of buffers comprises two or more respective buffers for each of at least one server accessing the at least one topic; and
   responding to transaction requests from the one or more clients or the at least one server by allocating an active access pointer for each of the one or more clients or each of the at least one server to at least one respective buffer using machine assembly language transactions;
   wherein the data is accessed by the at least one respective buffer using a zero-data copy exchange at an operating system level; and
   wherein the machine assembly language transactions perform asynchronous inter-process data communications between the at least one server and the one or more clients in the shared memory.

9. The method of claim 8 wherein accessing the data by the at least one respective buffer prevents data lock.

10. The method of claim 8 wherein the allocating the data into at least one topic, the assigning a single predetermined address, and the allocating the plurality of buffers for each of the at least one topic occurs during initialization of the shared memory.

11. The method of claim 8 wherein at least one of the allocating the data into the at least one topic, or the allocating the plurality of buffers for each of the at least one topic occurs during runtime based on the collective number of the clients and servers accessing the at least one topic.

12. The method of claim 8 wherein the responding to transaction requests further comprises directing the active access pointer of each of the number of the clients to the plurality of buffers comprising the most recent data in the shared memory.

13. The method of claim 12 further comprising the one or more clients or the at least one server performing a transaction on the data accessed.

14. The method of claim 13 wherein the performing a transaction comprises at least one of reading the data, writing new data to the buffer, or storing the buffer data to the shared memory.

15. The method of claim 14 further comprising, in response to a completed transaction request, updating directing the active access pointer for each respective client or each respective server to a different buffer comprising the most recent data.

* * * * *